(12) United States Patent
Ryoo et al.

(10) Patent No.: US 8,036,289 B2
(45) Date of Patent: Oct. 11, 2011

(54) APPARATUS AND METHOD FOR CORRECTING ITERATIVE RESIDUAL FREQUENCY AND PHASE IN TURBO CODED OFDM SYSTEM

(75) Inventors: Sun-Heui Ryoo, Daejon (KR); Kwon-Hue Choi, Gyeongbuk (KR); Do-Seob Ahn, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 706 days.

(21) Appl. No.: 12/094,282

(22) PCT Filed: Dec. 7, 2006

(86) PCT No.: PCT/KR2006/005259
§ 371 (c)(1),
(2), (4) Date: May 20, 2008

(87) PCT Pub. No.: WO2007/066984
PCT Pub. Date: Jun. 14, 2007

(65) Prior Publication Data
US 2008/0317143 A1 Dec. 25, 2008

(30) Foreign Application Priority Data
Dec. 8, 2005 (KR) .......... 10-2005-0119681
May 29, 2006 (KR) .......... 10-2006-0048235

(51) Int. Cl.
*H04K 1/10* (2006.01)
(52) U.S. Cl. ........ 375/260; 370/203; 714/780; 714/795; 375/262; 375/341; 375/242
(58) Field of Classification Search .......... None
See application file for complete search history.

(56) References Cited

U.S. PATENT DOCUMENTS
5,937,016 A 8/1999 Choi
(Continued)

FOREIGN PATENT DOCUMENTS
JP 2000-286819 10/2000
(Continued)

OTHER PUBLICATIONS

Vincenzo Lottici et al; "Embedding Carrier Phase Recovery Into Iterative Decoding of Turbo-Coded Linear Modulations", IEEE Transactions on Communications, vol. 52, No. 4, Apr. 2004, pp. 661-669.

(Continued)

*Primary Examiner* — Dac Ha
*Assistant Examiner* — Adolf Dsouza
(74) *Attorney, Agent, or Firm* — Ladas & Parry LLP

(57) ABSTRACT

Provided is an iterative residual frequency and phase compensation apparatus for an OFDM system and a method thereof. The apparatus includes: a first classifying unit for classifying symbol sequences by each subcarrier wave; a soft-decision calculating unit for calculating a soft-decision value of a data symbol using a soft-decision reliability obtained from iterative decoding performed by the iterative decoder; a classifying unit for classifying the soft-decision values by a carrier wave; a frequency estimating unit for estimating a residual frequency error of each carrier wave using the soft-decision value; a phase estimating unit for estimating an average residual phase error using the soft-decision value; a frequency and phase compensating unit for compensating frequencies and phases for input symbols of each carrier wave using the estimated frequency error and the estimated phase error; and a buffer for temporally storing the compensated symbols to provide it to the first classifying unit.

13 Claims, 3 Drawing Sheets

U.S. PATENT DOCUMENTS

| | | | |
|---|---|---|---|
| 6,219,334 B1 | 4/2001 | Sato et al. | |
| 6,289,000 B1 * | 9/2001 | Yonge, III | 370/203 |
| 6,771,715 B1 | 8/2004 | Rives et al. | |
| 6,801,567 B1 | 10/2004 | Schmidl et al. | |
| 2004/0091057 A1 * | 5/2004 | Yoshida | 375/260 |

FOREIGN PATENT DOCUMENTS

| | | | |
|---|---|---|---|
| JP | 2002-044049 | | 2/2002 |
| KR | 1019990058954 | | 7/1999 |
| KR | 1020000074901 | | 12/2000 |
| KR | 1020020027635 | * | 11/2003 |
| KR | 1020030089776 | | 11/2003 |
| WO | 03/058904 | | 7/2003 |

OTHER PUBLICATIONS

Catherine Morlet, et al; "A Carrier Phase Estimator for Multi-media Satellite Payloads Suited to RSC Coding Schemes", Communications, 2000. ICC 2000, 2000 IEEE International Conference vol. 1, pp. 455-459, Jun. 2000.

Achilleas Anastasopoulos, et al; "Adaptive Iterative Detection for Phase Tracking in Turbo-Coded Systems", IEEE Transactions on Communications, vol. 49, No. 12, Dec. 2001,pp. 2135-2144.

Antonio A. D'Amico, et al; "Efficient Non-Data-Aided Carrier and Clock Recovery for Satellite DVB at Very Low Signal-to-Noise Ratios", IEEE Journal on Selected Areas in Communications, vol. 19, No. 12, Dec. 2001, pp. 2320-2330.

Mauri J. Nissilä, et al; "An EM Approach to Carrier Phase Recovery in AWGN Channel", Communications, 2001. ICC 2001, IEEE International Conference on, vol. 7, pp. 2199-2203, Jun. 2001.

Bartosz Mielczarek, et al; "Phase Offset Estimation using Enhanced Turbo Decoders", Communications, 2002. IEEE International Conference on, vol. 3, pp. 1536-1540, Apr. 2002.

International Search Report mailed Mar. 19, 2007; PCT/KR2006/005259.

* cited by examiner

[Fig. 1]
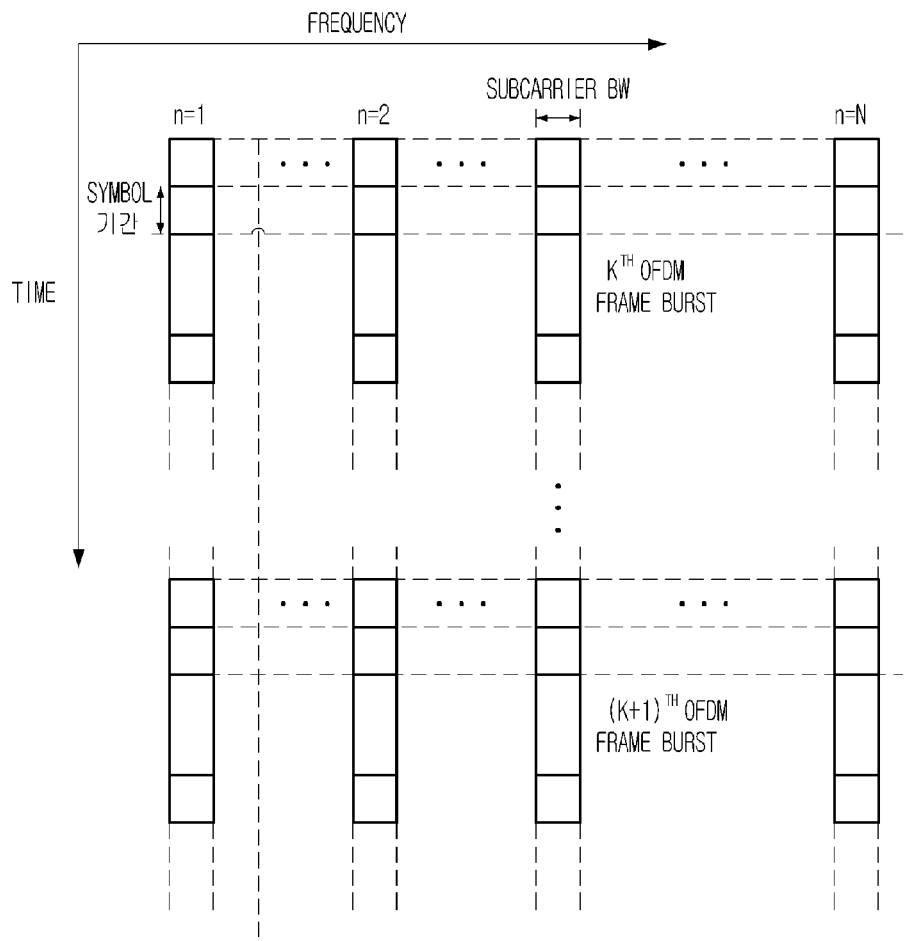
[Fig. 2]
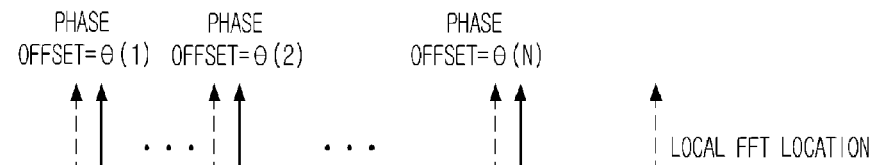
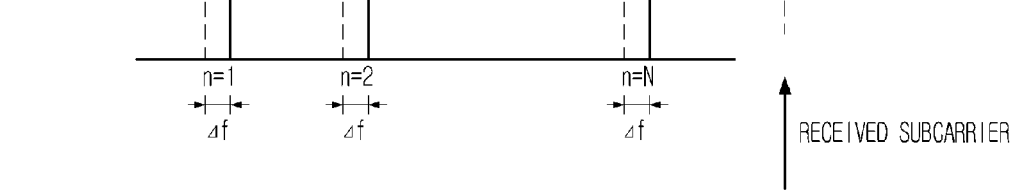
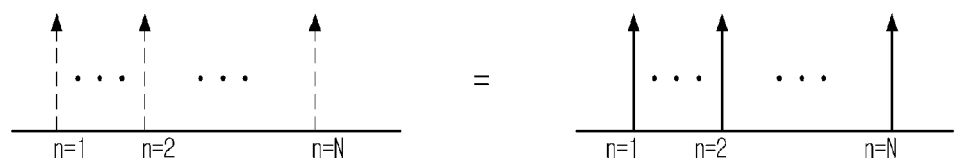

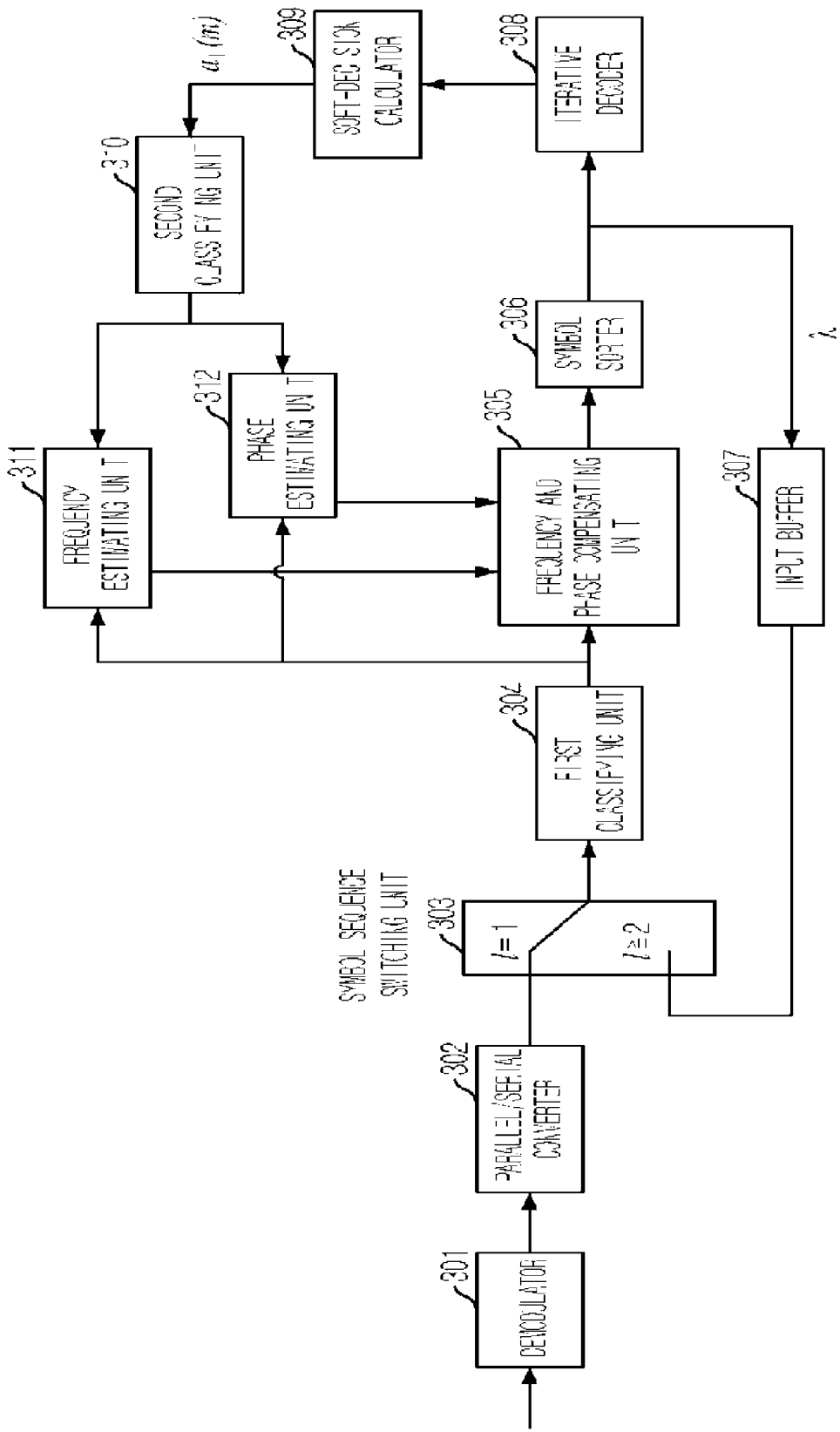
[Fig. 3]

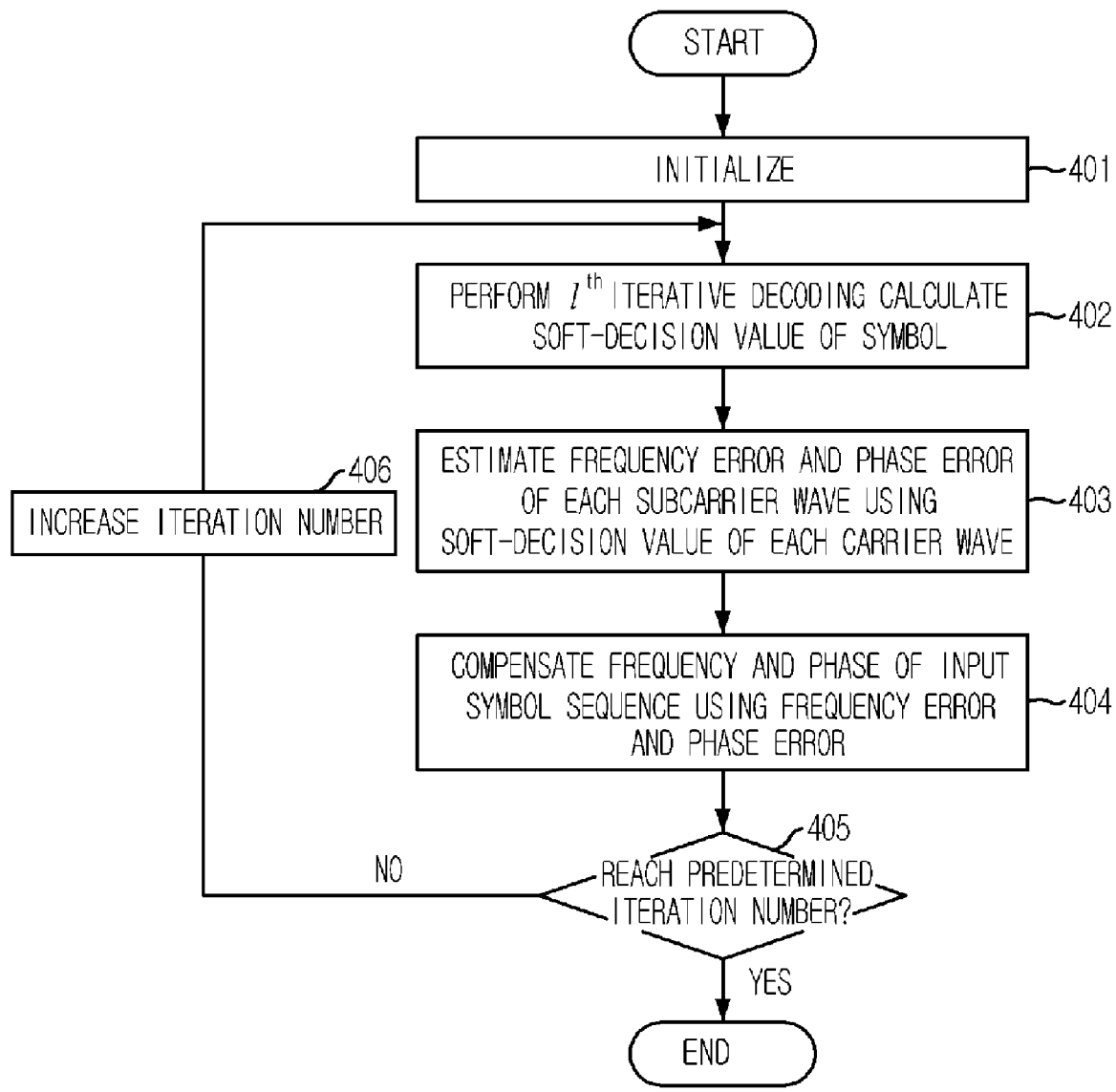
[Fig. 4]

APPARATUS AND METHOD FOR CORRECTING ITERATIVE RESIDUAL FREQUENCY AND PHASE IN TURBO CODED OFDM SYSTEM

TECHNICAL FIELD

The present invention relates to an apparatus and method for correcting an iterative residual frequency and phase in a turbo coded OFDM system in a low power environment, and a method thereof; and more particularly, to an iterative residual frequency and phase compensation apparatus for estimating and compensating the phase of a carrier wave iteratively using the soft-decision reliability of a channel decoder in a digital communication system using an OFDM modulation scheme, and a method thereof.

BACKGROUND ART

Portable mobile satellite communication has been receiving an attention as a next generation mobile communication, and many related technologies have been actively researched and developed. The portable mobile satellite communication uses a high frequency band, for example, higher than 10 GHz. Since the high frequency band is easily attenuated by wind or rain, various problems may be arisen. Especially, the portable mobile satellite communication requires a high design cost to sustain the receiving power level at an uplink similar to the receiving power level of a terrestrial wave because of the structural limitation of a portable terminal and the large power attenuation characteristic of satellite communication. Therefore, a synchronization unit of a portable mobile satellite MODEM must be designed to operate in a low signal-to-noise ratio (SNR).

Recently, an iterative phase synchronization method for a system using a turbo code at a low SNR was introduced. In this iterative phase synchronization method, a phase is estimated using the temporal discrimination variable of a symbol at every iteration stages, and the discrimination variable is updated by compensating the phase at a following iteration stage. As described above, the phase is continuously updated at iterative decoding stages unlike a conventional phase synchronization method. Therefore, an additional phase synchronization block is not required. Also, the iterative phase synchronization method uses phase error information obtained from one codeword only for decoding a corresponding code. Therefore, a delay problem caused by an unnecessary loop that is a feedback based synchronizing algorithm is not arisen in the iterative phase synchronization method.

However, since the iterative phase synchronization method assumes that a phase error is constant in a codeword, the phase errors of codewords are estimated based on the constant phase error at every iteration stages. Accordingly, the conventional iterative phase synchronization method cannot be used when a phase rotates in a codeword due to a residual frequency. Because the iterative phase synchronization method seriously degraded the performance thereof if the residual frequency error is present.

The residual frequency error is commonly generated in a codeword by a Doppler in the mobile communication environment. Although the Doppler is not present, the residual frequency error is generated when a preceding frequency synchronizing algorithm is not perfect. If the length of a codeword is comparatively short although the residual frequency error is generated, it is possible to assume a phase error as a constant in a codeword. However, since the length of a codeword having a high coding gain such as a turbo code or low-density parity-check (LDPC) is generally long, it is unreasonable to assume the phase error as the constant. As described above, to assume the phase error as a constant is very strict assumption. Therefore, the conventional iterative phase synchronization method has restricted applicability.

If code symbols are sequentially transmitted in a channel using a carrier wave, the iterative phase synchronization method can be applicable. On the contrary, since a high speed OFDM based transmission system modulates the code symbol stream of one codeword based on the OFDM modulation scheme, the code symbols are transmitted with different subcarrier waves as many as the number of the subcarrier waves. That is, the code symbols are grouped into N groups, where N denotes the number of subcarrier waves in the OFDM system. Then, the OFDM system transmits the code symbols sequentially in each subcarrier wave and transmits the code symbols with subcarrier waves in parallel. The subcarrier waves have different initial phase errors due to a timing error, a timing jitter and fading. It means that the phases of each subcarrier wave must be estimated independently. That is, a frequency and phase restoring method for a single carrier wave system must be modified to be suitable to the characteristics of the OFDM modulation method.

Recently, there have been many researches in progress for developing various wireless communication systems using an OFDM based wideband transmission method according to the requests of high speed data transmission. Also, the OFDM modulation scheme has been examined to apply it to the personal mobile satellite communication. According to such trends, there is a demand for a low power synchronization method for the OFDM modulation scheme.

DISCLOSURE OF INVENTION

Technical Problem

It is, therefore, an object of the present invention to provide an iterative residual frequency and phase compensation apparatus and a method thereof for effective synchronization in a low power environment by estimating and compensating the phase of a carrier wave iteratively using the soft-decision reliability of a channel decoder in a digital communication system using an OFDM modulation scheme.

Technical Solution

In accordance with one aspect of the present invention, there is provided an iterative frequency and phase compensation apparatus for in an OFDM communication system including a OFDM demodulator and an iterative decoder, including: a first classifying unit for classifying OFDM demodulated symbol sequences by each subcarrier wave according to a location in a frame of a corresponding data symbol; a soft-decision calculating unit for calculating a soft-decision value of a data symbol using a soft-decision reliability obtained from iterative decoding performed by the iterative decoder; a second classifying unit for receiving the soft-decision values from the soft-decision calculating unit and classifying the received soft-decision values by a carrier wave; a frequency estimating unit for estimating a residual frequency error of each carrier wave for symbols of each carrier wave inputted from the first classifying unit using the soft-decision value of each carrier wave inputted from the second classifying unit; a phase estimating unit for estimating an average residual phase error of carrier waves for symbols of each carrier wave inputted from the first classifying unit using the soft-decision value of each carrier wave inputted from the second classifying unit; a frequency and phase compensating unit for compensating frequencies and phases for input symbols of each carrier wave using the estimated frequency error and the estimated phase error; and a buffering unit for temporally storing frequency and phase compensated symbols from the frequency and phase compensating unit to provide the frequency and phase compensated symbols to the first classifying unit.

In accordance with another aspect of the present invention, there is provided an iterative frequency and phase compensation method for an OFDM communication system including an OFDM demodulator and an iterative decoder, the method including the steps of: a) calculating a soft-decision value using soft-decision reliability obtained at a $l^{th}$ decoding stage; b) arranging symbols of each subcarrier wave according to a location in an OFDM frame of a corresponding data symbol; c) estimating a frequency error and a phase error for the arranged symbol of each subcarrier wave using the calculated soft-decision value; d) compensating frequencies and phases of all code symbols in a corresponding carrier wave using the estimated frequency error and the estimated phase error; e) rearranging updated sample values of each frequency and phase compensated code symbol according to an order of original code symbol sequence and inputting the rearranged sample values to the iterative decoder; and f) performing the steps a) to e) until the number of decoding stage reaches at a predetermined iterative number.

Advantageous Effects

An iterative residual frequency and phase compensation apparatus and a method thereof according to the present invention can merge the iterative decoding of a single OFDM frame with the estimation and compensation of a frequency and a phase of each carrier wave in a multi carrier waves system for high data transmission, and can effectively remove residual frequency and phase from a comparative low energy region. Therefore, the system performance thereof can be improved.

BRIEF DESCRIPTION OF THE DRAWINGS

The above and other objects and features of the present invention will become apparent from the following description of the preferred embodiments given in conjunction with the accompanying drawings, in which:

FIG. 1 is a layout of a code symbol in a typical OFDM frame;

FIG. 2 is a view for describing the initial residual frequency error and a residual phase error of a channel receiving signal;

FIG. 3 is a block diagram illustrating an iterative frequency and phase compensation apparatus in accordance with an embodiment of the present invention; and FIG. 4 is a flowchart of an iterative frequency and phase compensation method in accordance with an embodiment of the present invention.

BEST MODE FOR CARRYING OUT THE INVENTION

Other objects and aspects of the invention will become apparent from the following description of the embodiments with reference to the accompanying drawings, which is set forth hereinafter.

FIG. 1 is a layout of a code symbol in a typical OFDM frame.

An orthogonal frequency division multiplexing (OFDM) system simultaneously transmits N code symbols using N subcarrier wave, when the length of a codeword is L, and a $l^{th}$ codeword symbol is C[L]. Therefore, each of the subcarrier waves transmits L/N code symbols.

When a codeword is transmitted as a new OFDM frame or when a codeword is transmitted with a predetermined time interval in a same frame, an initial frequency error and an initial phase error are generated due to time-varying fading environment. Also, the initial phase error is generated at each of subcarrier waves. Since Doppler or local oscillator error generates the initial frequency error, carrier waves have a same frequency error. On the contrary, the carrier waves do not have same phase errors because the initial phase error is generated by OFDM symbol synchronization error or fading. Meanwhile, each subcarrier wave can be assumed to have an independent phase error because the interval of the subcarrier waves is set to wider than interference bandwidth in order to overcome frequency selective fading.

FIG. 2 is a view for describing the initial residual frequency error and a residual phase error of a channel receiving signal.

Referring to FIG. 2, $\Delta f$ denotes an initial frequency error and $\theta(n)$ denotes the initial phase error of an $n^{th}$ subcarrier wave allocated for code transmission. In the present invention, it assumes that $\theta(n)$ is independent from n and $\theta(n)$ has uniform distribution in $[-\theta_{max}, \theta_{max}]$. Also, it assumes that the residual phase errors of each carrier wave are constant while codewords are transmitting.

FIG. 3 is a block diagram illustrating an iterative frequency and phase compensation apparatus in accordance with an embodiment of the present invention.

The iterative frequency and phase compensation apparatus according to the present embodiment arranges OFDM modulated symbol sequences in serial and inputs the serial symbol sequence to a turbo iterative decoder 308 at the first decoding stage. After the first decoding stage, the iterative frequency and phase compensation apparatus corrects the input symbols of a preceding decoding stage based on a phase error and frequency error estimated at the preceding decoding stage. Then, the iterative frequency and phase compensation apparatus inputs the corrected symbols to the turbo iterative decoder 308.

Referring to accompanying drawings, the iterative frequency and phase compensation apparatus according to the present embodiment will be described in detail.

An OFDM demodulator 301 demodulates input symbol sequences, and a parallel/serial converter 302 serializes the demodulated symbol sequence from the OFDM demodulator 301. A symbol sequence switching unit 303 selects a symbol sequence outputted from the parallel/serial converter 302 at the first decoding stage. Or, the symbol sequence switching unit 303 selects a symbol sequence inputted from an input buffer 307 that temporally stores a serial symbol sequence generated at the second decoding step (l=2) in order to provide a corrected symbol sequence to an iterative decoder 308, where the corrected symbol sequence is a symbol sequence corrected based on a phase error and a frequency error estimated at the previous decoding stage.

A first classifying unit 304 receives the selected serial symbol sequence from the symbol sequence switching unit 303 and classifies the received serial symbol sequence by a carrier wave. After classifying, the first classifying unit 304 outputs the classified symbol sequences to a frequency estimating unit 311, a phase estimating unit 312, and a frequency and phase compensating unit 305. That is, the first classifying unit 304 rearranges the symbol sequences of each carrier wave in a time domain according to a location in the OFDM frame of corresponding data symbol and outputs the rearranged symbol sequences to the frequency estimating unit 311, the phase estimating unit 312 and the frequency and phase compensator 305.

In order to estimate a frequency error and a phase error at each of iterative decoding stages, a soft-decision calculator 309 calculates and outputs the soft-decision value $a_l(m)$ of a $m^{th}$ data symbol as a soft-decision reliability obtained from a current decoding stage, that is, a $l^{th}$ decoding stage. The soft-decision calculator 309 may be embodied using a tanh calculator and calculate the soft-decision value as like a following Eq. 1.

$$\text{BPSK: } a_l(m) = \tanh\left(\frac{L_l(m)}{2}\right) \quad \text{Eq. 1}$$

$$\text{QPSK: } a_l(m) = \tanh\left(\frac{L_{l,in}(m)}{2}\right) + \tanh\left(\frac{L_{l,qudri}(m)}{2}\right)$$

In Eq. 1, $L_l(m)$ denotes the log likelihood ratio (LLR) of an $m^{th}$ data symbol when a subcarrier wave is a BPSK modulation. $L_{l,in}(m)$ and $L_{l,quadri}(m)$ denote the soft-decision reliabilities of a real part and an imaginary part in a $m^{th}$ data symbol when a subcarrier wave is the BPSK modulation.

A second classifying unit 310 receives the calculated soft-decision values from the soft-decision calculator 309 and classifies the received soft-decision values by a carrier wave. After classifying, the second classifying unit 310 provides the classified soft-decision values to the frequency estimating unit 311 and the phase estimating unit 312.

The frequency estimating unit 311 estimates a residual frequency error for the classified symbol sequence inputted from the first classifying unit 304 using the soft-decision value inputted from the second classifying unit 310. Also, the phase estimating unit 312 estimates an average residual phase error for the symbol sequences of each carrier wave inputted from the first classifying unit 304 using the soft-decision value inputted from the second classifying unit 310.

The frequency and phase compensating unit 305 compensates the frequencies and the phases of all code symbols in a corresponding carrier wave inputted from the first classifying unit 304 using the average residual phase error and the residual frequency error of the carrier wave, which are estimated carrier wave at the frequency estimating unit 311 and the phase estimating unit 312.

A symbol sorter 306 rearranges the compensated symbol sequence from the frequency and phase compensator 305 according to the order of original code symbol sequence, and outputs the rearranged symbol sequence to the iterative decoder 308. The compensated symbol sequence is also buffered at the input buffer 308 for the next decoding stage. Hereinafter, the operation for compensating the frequency and the phase of each carrier wave will be described in detail.

The frequency and phase compensating unit 305 compensates the phase error of an $m^{th}$ data symbol value $y_l(m)$ using a soft-decision value obtained from the soft-decision calculator 309 as shown in Eq. 2.

$$s_l(m) = y_l(m) a_l^*(m) \quad \text{Eq. 2}$$

Basically, a residual phase error and a residual frequency error of each subcarrier wave are estimated using the phase of compensated symbol $s_l(m)$ in Eq. 2. Since codewords are transmitted by a plurality of subcarrier waves in the OFDM system, the residual phase error and the residual frequency error must be estimated independently for each carrier wave.

Therefore, the first classifying unit 304 rearranges the compensated symbols $S_1(m)$ by each subcarrier wave in a time domain according to the location in an OFDM frame of a corresponding data symbol. Using rearranged samples of $S_1(m)$, the frequency estimating unit 311 and the phase estimating unit 312 estimate the residual frequency error and the residual phase error.

When the $j^{th}$ data symbol of an $n^{th}$ carrier wave is $$s_l^n(j),$$

the average residual phase error of $n^{th}$ carrier waves can be obtained using Eq. 3.

$$\hat{\theta}_l(n) = \arg\left\{\sum_{j=1}^{J} s_l^n(j)\right\} \quad \text{Eq. 3}$$

In Eq. 3, J denotes the number of data symbols in each carrier wave. When a code rate is r, J is given as Eq. 4.

$$J = \frac{Lr}{N} \quad \text{Eq. 4}$$

Also, the residual frequency error $$\Delta \hat{f}_l(n)$$

of an $n^{th}$ carrier wave can be estimated by measuring the phase variation of $$s_l^n(j),$$

that is, moment phase gradients. If a symbol interval for measuring a gradient is d, a frequency can be estimated using three methods shown in Eq. 5.

$$\Delta \hat{f}_{l,arg\&mean}^n = \frac{r}{dT_S} \times \frac{\sum_{j=1}^{J-d} \arg[s_l^n(j+d)/s_l^n(j)]}{J-d} \quad \text{Eq. 5}$$

$$= \frac{r}{dT_S} \times \frac{\sum_{j=1}^{J-d} \arg[s_l^n(j+d)] - \sum_{j=1}^{J-d} \arg[s_l^n(j)]}{J-d}$$

$$\Delta \hat{f}_{l,conj\&mean}^n = \frac{r\arg\sum_{j=1}^{J-d}[s_l^n(j+d)s_l^{n*}(j)]}{dT_S}$$

$$\Delta \hat{f}_{l,sum\&conj}^n = \frac{r\arg\left\{\left[\sum_{j=1}^{J-d}[s_l^n(j+d)]\right]\left[\sum_{j=1}^{J-d}s_l^n(j)\right]^*\right\}}{dT_S}$$

$$= \frac{r\left\{\arg\left[\sum_{j=1}^{J-d}s_l^n(j+d)\right] - \arg\left[\sum_{j=1}^{J-d}s_l^n(j)\right]\right\}}{dT_S}$$

In Eq. 5, $T_s$ denotes an OFDM symbol interval, and r denotes a code rate. The first method estimates the frequency by obtaining the means of phase variation. The second method estimates the frequency by obtaining a phase after adding the results of conjugate multiplication between symbols. The third method estimates the frequency by obtaining a phase difference after adding all front symbol and rear symbols separated at a symbol interval d. Since the third method requires only two operations for estimating phases and adding complex numbers, the computation complex of the third method is lower than other two methods.

Since it assumes that the frequency errors of all carrier waves are same in the present invention, the reliability of estimating frequency error is improved using the average value of estimated frequency errors of each subcarrier wave as the final frequency error.

$$\Delta \hat{f}_l = \frac{\sum_{n=1}^{N} \Delta \hat{f}_l^n}{N} \qquad \text{Eq. 6}$$

Using the estimated frequency error and phase error of each subcarrier wave, the frequency and phase compensating unit 305 compensates the frequencies and the phases of all code symbols belonging to a corresponding carrier wave.

$$y_{l+1}^n(m) = y_l^n(m)\exp\left[-j\left(2\pi\Delta\hat{f}_l\left(m - \frac{L/N}{2}\right)T_S + \hat{\theta}_l(n)\right)\right] \qquad \text{Eq. 7}$$

In Eq. 7, $$y_l^n(m)$$

is the input of an $l^{th}$ iterative decoding stage for the $m^{th}$ symbol of an $n^{th}$ subcarrier wave in an OFDM frame.

After compensating the frequency and the phase of each carrier wave, the symbol sorter 306 transforms the updated sample values $$y_l^n(m)$$

of each code symbol according to the order of original code symbol sequence and outputs the result thereof to the iterative decoder 308. Therefore, the $l^{th}$ iterative decoding stage is completely finished with the frequency and phase compensation.

As described above, the currently inputted codeword is decoded with the frequency error and the phase error compensated by recursively repeating the iterative decoding stage until the number of performing the decoding reaches to a predetermined iterative number.

FIG. 4 is a flowchart of an iterative frequency and phase compensation method in accordance with an embodiment of the present invention.

At first, an initializing operation is performed at step S401. That is, the number of iterative decoding stage l is initialized as '1' parallel symbol sequences demodulated at an OFDM demodulator are serialized, the serial symbol sequences are classified by a carrier wave, and the classified symbol sequences are inputted to the iterative decoder at step S401.

Then, the $l^{th}$ iterative decoding is performed and the soft-decision value of a symbol is calculated using Eq. 1 at step S402.

At step S403, the symbols of each subcarrier wave are sorted in a time domain according to a location in an OFDM frame of a corresponding data symbol, and the frequency error and the phase error of each carrier wave are compensated using the soft-decision values of each carrier wave.

As a method for estimating the frequency error of each carrier wave, the above mentioned three methods can be used. The first method estimates the frequency error by obtaining the means of phase variation. The second method estimates the frequency error by obtaining a phase after adding the results of conjugate multiplication between symbols. The third method estimates the frequency error by obtaining a phase difference after adding all front symbol and rear symbols separated at a symbol interval d.

Since it assumes that the frequency errors of all subcarrier waves are same in the present invention, the reliability of estimating frequency error is improved using the average value of estimated frequency errors of each subcarrier wave as the final frequency error.

At step S404, the frequency and the phase of all code symbols in a corresponding carrier wave are corrected using the estimated frequency error and the estimated phase error of each carrier wave.

Then, the updated sample value of each code symbol is transformed according to the order of original code symbol sequence for iterative decoding, and the transformed sample value is inputted to the iterative decoder. As inputting the sample value to the iterative decoder, the $l^{th}$ iterative decoding stage is completely finished with the frequency and phase compensation.

At step S405, it determines whether the number of performing the iterative decoding l reaches to a predetermined iterative decoding number or not. If not, the number of performing the iterative decoding l increases by one at step S406, and the step S402 for calculating the soft-decision value is repeatedly performed. If the number of performing the iterative decoding l reaches to the predetermined iterative decoding number, it determines that the iterative decoding for the current codeword is completely finished with the frequency and phase error compensation.

The above described method according to the present The present application contains subject matter related to Korean patent application No. 2005-0119681, filed in the Korean Intellectual Property Office on Dec. 8, 2005, and Korean patent application No. 2006-0048235, filed in the Korean Intellectual Property Office on May 29, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An iterative frequency and phase compensation apparatus for an OFDM communication system including a OFDM demodulator and an iterative decoder, comprising:
a first classifying means for classifying OFDM demodulated symbol sequences by each subcarrier wave according to a location in a frame of a corresponding data symbol;
a soft-decision calculating means for calculating a soft-decision value of a data symbol using a soft-decision reliability obtained from iterative decoding performed by the iterative decoder;
a second classifying means for receiving the soft-decision values from the soft-decision calculating means and classifying the received soft-decision values by a carrier wave;
a frequency estimating means for estimating a residual frequency error of each carrier wave for symbols of each carrier wave inputted from the first classifying unit using the soft-decision value of each carrier wave inputted from the second classifying unit;
a phase estimating means for estimating an average residual phase error of carrier waves for symbols of each carrier wave inputted from the first classifying unit using the soft-decision value of each carrier wave inputted from the second classifying unit;
a frequency and phase compensating means for compensating frequencies and phases for input symbols of each carrier wave using the estimated frequency error and the estimated phase error; and
a buffering means for temporally storing frequency and phase compensated symbols from the frequency and phase compensating means to provide the frequency and phase compensated symbols to the first classifying means;
wherein the residual frequency error and the average residual phase error are estimated using phases of the compensated symbols according to the soft-decision value;
wherein the phase estimating means calculates a sum-average value of the phases of the compensated symbols for the symbols of each carrier wave determined according to a code rate.

2. The iterative frequency and phase compensation apparatus as recited in claim 1, further comprising a symbol sorting means for rearranging the frequency and phase compensated symbols according to the order of original code symbol sequence.

3. The iterative frequency and phase compensation apparatus as recited in claim 1, further comprising:
a parallel/serial converting means for serializing symbols demodulated by the OFDM demodulator; and
a symbol sequence switching means for providing symbols outputted from the parallel/serial converting means to the first classifying means for a first decoding stage, and providing symbols stored in the buffering means to the first classifying means from a second decoding stage.

4. The iterative frequency and phase compensation apparatus as recited in claim 3, wherein the soft-decision calculating means calculates a soft-decision value of a symbol based on soft-decision reliability obtained from a predetermined decoding stage using an equation as:

$$BPSK: a_l(m) = \tanh\left(\frac{L_l(m)}{2}\right)$$
$$QPSK: a_l(m) = \tanh\left(\frac{L_{l,in}(m)}{2}\right) + \tanh\left(\frac{L_{l,qudri}(m)}{2}\right)$$

where $L_l(m)$ denotes a log likelihood ratio of a $m^{th}$ data symbol when a subcarrier wave is BPSK modulation, and $L_{l,in}(m)$ and $L_{l,quadri}(m)$ denote soft-decision values of a real part and an imaginary part when a subcarrier wave is a QPSK modulation.

5. The iterative frequency and phase compensation apparatus as recited in claim 3, wherein the frequency estimating means calculates an average of estimated frequency errors of each subcarrier wave and uses the calculated average as a final estimated frequency error.

6. The iterative frequency and phase compensation apparatus as recited in claim 5, wherein the frequency estimating means estimates a residual frequency error of a subcarrier wave by calculating an average of phase variation of symbols of each carrier wave.

7. The iterative frequency and phase compensation apparatus as recited in claim 5, wherein the frequency estimating means estimates a residual frequency error of a subcarrier wave by obtaining a phase after adding the results of conjugate multiplication between symbols.

8. The iterative frequency and phase compensation apparatus as recited in claim 5, wherein the frequency estimating means estimates a residual frequency error of a subcarrier wave by obtaining a phase difference after adding all front symbol and rear symbols separated at a predetermined distance.

9. An iterative frequency and phase compensation method for an OFDM communication system including an OFDM demodulator and an iterative decoder, the method comprising the steps of:
a) calculating a soft-decision value using soft-decision reliability obtained at a $l^{th}$ decoding stage;
b) arranging symbols of each subcarrier wave according to a location in an OFDM frame of a corresponding data symbol;
c) estimating a frequency error and a phase error for the arranged symbol of each subcarrier wave using the calculated soft-decision value;
d) compensating frequencies and phases of all code symbols in a corresponding carrier wave using the estimated frequency error and the estimated phase error;
e) rearranging updated sample values of each frequency and phase compensated code symbol according to an order of original code symbol sequence and inputting the rearranged sample values to the iterative decoder; and
f) performing the steps a) to e) until the number of decoding stage reaches at a predetermined iterative number;
wherein the frequency error and the phase error are estimated using phases of the compensated code symbols according to the soft-decision value;
wherein the phase error is calculated a sum-average value of the phases of the compensated code symbols for the symbols of each carrier wave determined according to a code rate.

10. The iterative frequency and phase compensation method recited in claim 9, wherein in the step a), a soft-decision value of a symbol is calculated based on soft-decision reliability obtained from a predetermined decoding stage using an equation as:

$$BPSK: a_l(m) = \tanh\left(\frac{L_l(m)}{2}\right)$$
$$QPSK: a_l(m) = \tanh\left(\frac{L_{l,in}(m)}{2}\right) + \tanh\left(\frac{L_{l,qudri}(m)}{2}\right)$$

where $L_l(m)$ denotes a log likelihood ratio of a $m^{th}$ data symbol when a subcarrier wave is BPSK modulation, and $L_{l,in}(m)$ and $L_{l,quadri}(m)$ denote soft-decision values of a real part and an imaginary part when a subcarrier wave is a QPSK modulation.

11. The iterative frequency and phase compensation method recited in claim 9, wherein in the step c), a residual frequency error of a subcarrier wave is estimated by calculating an average of phase variation of symbols of each carrier wave, and an average value of the estimated frequency errors of each subcarrier waves are used as a final estimated frequency error.

12. The iterative frequency and phase compensation method recited in claim 9, wherein in the step c), a residual frequency error of a subcarrier wave is estimated by obtaining a phase after adding the results of conjugate multiplication between symbols, and an average value of the estimated frequency errors of each subcarrier waves are used as a final estimated frequency error.

13. The iterative frequency and phase compensation method recited in claim 9, wherein in the step c), a residual frequency error of a subcarrier wave is estimated by obtaining a phase difference after adding all front symbol and rear symbols separated at a predetermined distance, and an average value of the estimated frequency errors of each subcarrier waves are used as a final estimated frequency error.

* * * * *